United States Patent [19]
Lacroix

[11] 3,788,420
[45] Jan. 29, 1974

[54] DIFFERENTIAL TYPE DRIVING WHEELS SYSTEM

[76] Inventor: Jean Paul Lacroix, 12064 Taylor Blvd., Montreal, Quebec, Canada

[22] Filed: Jan. 27, 1972

[21] Appl. No.: 221,348

[52] U.S. Cl.................................. 180/74, 180/76
[51] Int. Cl............................................ B60k 23/00
[58] Field of Search................................ 180/74, 76

[56] References Cited
UNITED STATES PATENTS
3,446,302  5/1969  Schoonover...................... 180/74 X
3,447,622  6/1969  Ovshinsky et al................. 180/74 X Primary Examiner—Richard E. Aegerter
Assistant Examiner—H. S. Lane

[57] ABSTRACT

Two webbed driving wheels are rigidly secured at both ends of a rotating live axle, which axle, through a system of pullies and belt and a torque-converter, receives the rotating power generated by a motor. The webs of the driving wheels are made of resilient or flexible material and a certain number of these webs are in constant frictional engagement with two pairs of driven wheels. The power generated by the motor is transmitted to the driven wheels by the driving wheels and this, due to the frictional contact existing between them. When negociating curves the resilient webs of the driving wheels act as a differential system.

9 Claims, 5 Drawing Figures

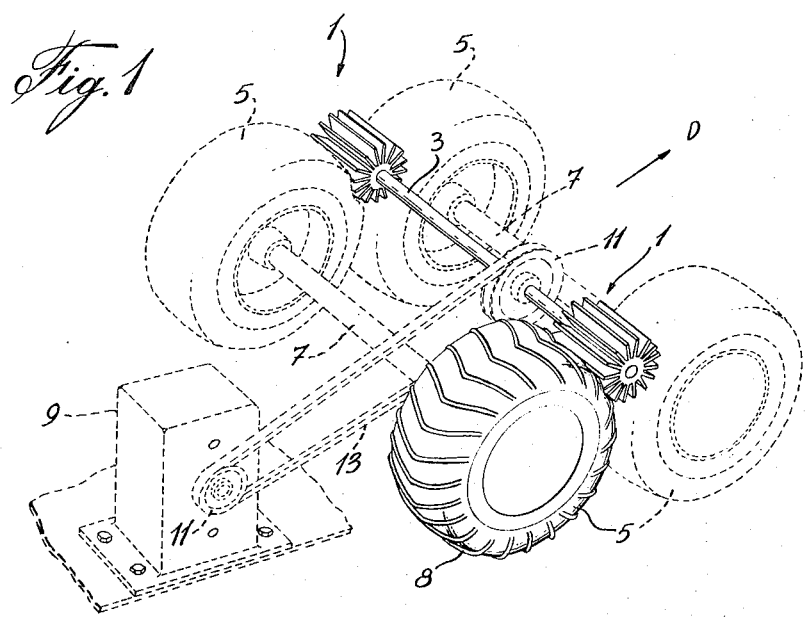
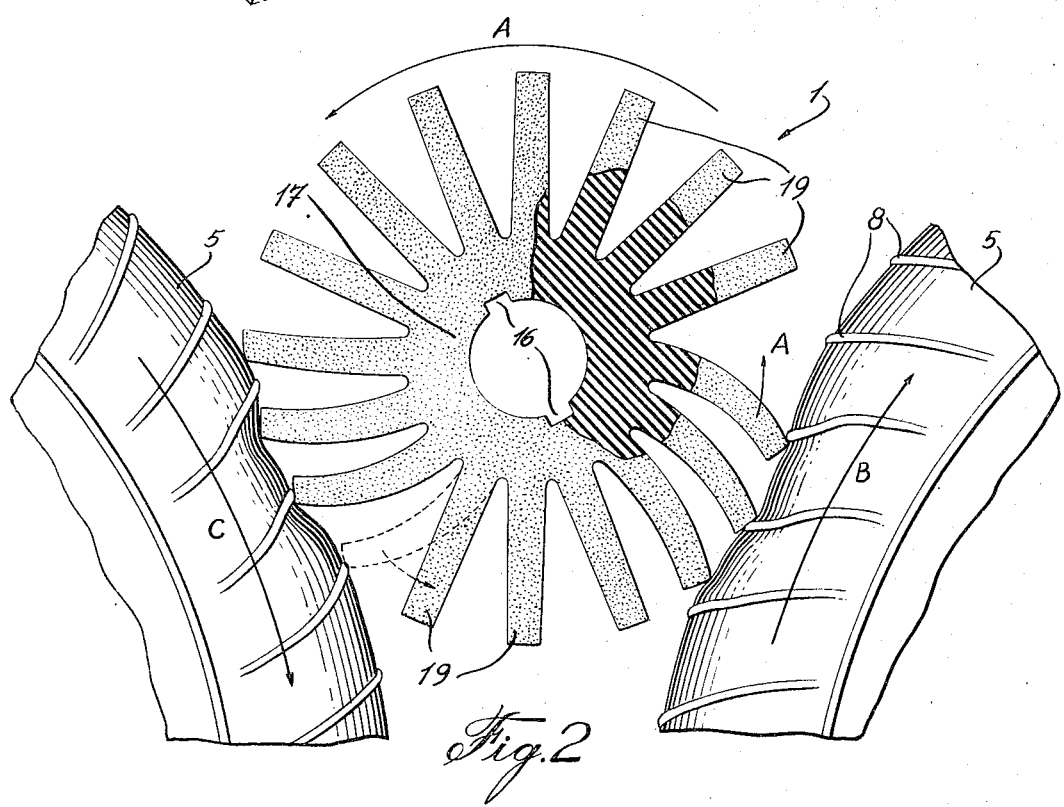

DIFFERENTIAL TYPE DRIVING WHEELS SYSTEM

The invention relates to a transmission system applied to any types of self-propelled vehicles, the propelling wheels of which are on stationary axles in relation to the body of the vehicle, such as all terrain vehicles, garden or farm tractors, earth moving machinery, graders, lumbering machinery or the like.

More particularly, the invention relates to a unique axle differential type driving wheels system, for providing the frictional driving of all terrain type vehicles. This system replaces the complex and costly differentials and multiple live axles shafts existing in such vehicles by only one live axle, and yet, permits the retaining of full differential movement in propulsion for each and every one of the four driven wheels, with the additional individual advantage of limited slip.

In the existing vehicles wherein there are the provision of frictional driving wheels disposed between two pairs of driven wheels for the purpose of driving the latter or for the purpose of transferring the power from one set of driving wheels to an adjacent set of non-driving wheels, or for improving the traction of the vehicle when the condition of the road so requires, there are the provision of bearings, universal joints, differentials housings, chains, chain tensioners, chain housings, sprocket-wheels, differential gears and gear boxes, hydraulic or air power support, all these complicating the system and necessitating more constant and frequent maintenance such as greasing, oiling, etc.

The invention consists of two webbed driving wheels rigidly secured at both ends of a rotating live axle, which axle, through a system of pullies and belt and a torque-converter, receives the rotating power generated by a motor. The webs of the driving wheels are made of resilient or flexible material and a certain number of these webs are in constant frictional engagement with two pairs of driven wheels. The power generated by the motor is transmitted to the driven wheels by the driving wheels and this, due to the frictional contact existing between them. When negociating curves the resilient webs of the driving wheels act as a differential system.

One object of the present invention is the provision of a driving system which through its extreme simplification minimizes both the weight and the cost of the vehicles so equiped.

Another object of the invention is the provision of a driving system, which through the simplicity of its design makes field repairs not only possible but also fast and easy, and possibly a one man's job, even on heavy machinery, by permitting a damaged part to be replaced from outside by merely slipping a spare one in, with the removal of only one nut.

A further object of the invention is the provision of a driving system which, through the simplicity of its design avoids the complexity, high fabrication cost, high maintenance cost, of multiple live axles, universal joints, gear differentials, differential boxes, chains, chain tensioners, chain housings, sprocket-wheels, etc. In fact all these items are replaced by a unique live axle provided with two webbed driving wheels at its extremities.

The foregoing and other features and advantages will become more apparent from the following description having references to the appended drawings wherein:

FIG. 1 is a perspective view of a unique live axle and of two differential type driving wheels according to the invention shown mounted in frictional engagement with two pairs of driven wheels on an all terrain vehicle;

FIG. 2 is a side view of one of the differential type driving wheels according to the invention, partially cutway, showing the way the driving wheel engages the driven wheels for the purpose of driving the vehicle;

FIG. 3 is a side view of a driving wheel according to the invention, partially cut-way, showing the form of the wheel and the parts it is composed of;

Figure 3:
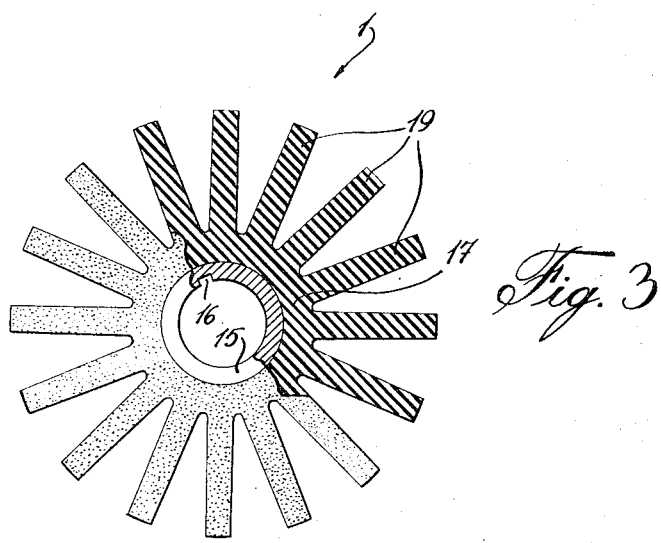

Referring now to the drawings, FIG. 1 shows two driving wheels 1 rigidly fixed at both ends of a live axle 3, which axle may be connected to the frame of the vehicle or may be supported by any conventional means (not shown).

Each wheel 1 is in frictional engagement with a pair of driven wheels 5. There is one pair of such wheels 5 at each side of the vehicle. A right side wheel 5 and a left side wheel 5 are rotatably mounted at both ends of a dead or stationary axle or shaft 7. Each wheel 5 freely rotates around the dead axle in a conventional manner.

By driven wheels 5 it must be understood the wheels which, when driven by a driving mechanism, such as the driving wheels 1 in the present case, provides the propelling or moving of the vehicle.

It is to be noted that the driven wheels 5 are not the steering or direction wheels of the vehicle. In fact, the vehicle is provided with front wheels (not shown) for steering purposes.

Driven wheels 5 are provided with ribs 8 for facilitating their frictional engagement with the driving wheels 1 as will be explained later.

A motor 9, of conventional type, fixed to the frame of the vehicle transmits power, through a system of pullies 11 and belt 13, and a torque-converter (not shown) to axle 3 and therefore to driving wheels 1.

The power is then transmitted to the periphery of driven wheels 5 by means of the frictional engagement of wheels 1 with the wheels 5 as will be explained in latter paragraphs.

Figure 4:
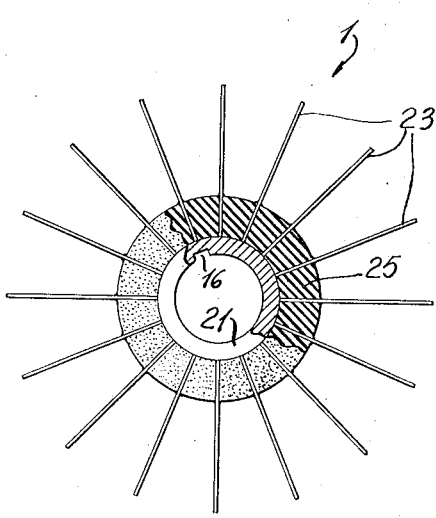
FIG. 4 is a second embodiment of a driving wheel according to the invention.
Figure 5:
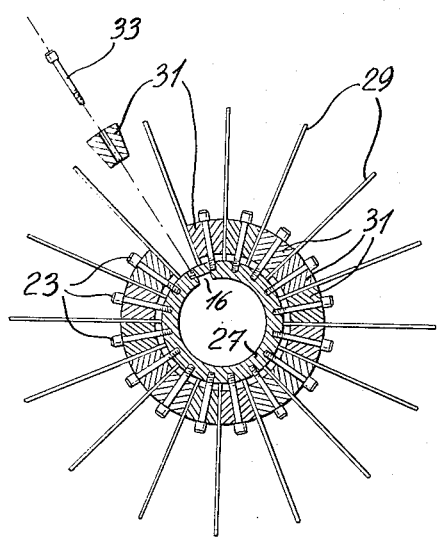
FIG. 5 is a further embodiment of a driving wheel according to the invention.

FIGS. 3, 4 and 5 show three embodiments of driving wheels 1 that may be used in the invention for obtaining the desired results.

FIG. 3 shows a wheel 1 made of a metal sleeve 15, over which is rigidly secured an annularly shaped resilient part 17. The resilient part is provided with webs 19 formed integrally thereof and radially projecting therefrom. Any other adequate ways of connecting the webs to the annularly shaped resilient part may also be used.

In this kind of driving wheel the metal sleeve may be eliminated and the entire wheel be made of only resilient material as shown in FIG. 2.

As resilient material for both the annular resilient part 17 and the resilient webs 19, it may advantageously be used solid polyurethane which may be cast or molded. Plastic or the like material may also be used.

This type of driving wheel is of low cost and is used for light duty vehicles such as garden tractors, light or recreational type vehicles, like all terrain vehicles.

FIG. 4 shows a wheel 1 made of a metal sleeve 21, over which is rigidly secured an annularly shaped resilient part 25. Spring blades or webs 23 are rigidly secured to the annular part 25 and radially project therefrom. The annular part 25 may be cast or molded in place and blades 23 imprisoned therein.

For the resilient material, it may be used solid polyurethane or plastic or the like.

This type of drving wheel is designated for average duty vehicles, such as farm tractors.

FIG. 5 shows a wheel 1 made of a metal sleeve 27, surrounded by independent spring blades or webs 29 radially projecting therefrom and which are wedged in place by metal wedges 31. The wedges 31 are pressed in and held in place by cap screws 33.

This type of wheel 1 is designated for heavy duty vehicles, such as heavy tractors, earth moving machinery, graders, lumbering machinery.

In all of these types of driving wheels the thickness of each web is in relation to the average torque to be transmitted from the motor to the periphery of the driven wheels 5.

The outside diameter of a driving wheel 1 is also in relation to the outside diameter of the driven wheels and the multiplication of thrust required at the periphery of the driven wheels.

By outside diameter of a driving wheel it is meant the diameter measured from tip to tip of two diametrically opposite webs.

As shown in the figures, the metal sleeve 15, 21 or 27 is provided with a spline 16 or splines for the purpose of rigidly securing the wheel at the end of the live axle 3.

The mode of operation of this differential type driving wheels system will now be explained with reference to FIGS. 1 and 2.

In the straight forward movement of the vehicle, when the power generated by motor 9 is transmitted to live axle 3 and therefore to the webbed driving wheels 1, a torque is developed at the ends of the axle 3, which torque is evenly distributed at the free ends or tips of the webs composing the driving wheels 1.

As above-mentioned and clearly shown in FIG. 2, each driving wheel 1 is in constant frictional engagement with a pair of driven wheels 5. This frictional engagement is made possible through a predetermined number of webs. The torque existing at the tip of each web which is in contact with the periphery of driven wheels 5 is thus transmitted to these driven wheels 5. The sum of the torques thus transmitted provides the rotation of the driven wheels 5 and therefore the moving or propelling of the vehicle. As clearly shown in FIG. 2, when the driving wheels 1 rotate in the direction of arrow A, each driven wheel 5 rotates in the direction of arrows B and C, respectively, and the vehicle advances in the direction of arrow D (FIG. 1).

Under the influence of the torque existing at the tip of each web, each web which comes into contact with the periphery of the driven wheels 5 is bent rearward, in the opposite direction of arrow A, in proportion to the applied torque. This bending of the webs will of course vary according to continuously varying factors, such as the condition of the road (holes and mounds), the pressure or the diameter of each driven wheel etc., but the moving or propelling action of the driving wheels will not be effected.

The webs of the driving wheels are made of such a material and are so dimensioned as to permit the bending of the webs, but yet to provide the necessary strength for transmitting the propelling power of the motor 9 to the driven wheels 5.

For the reverse movement the same principle as above-explained applies but in the reverse direction.

When negotiated curves this arrangement of drive wheels 1 and driven wheels 5 acts as a differential system as will be explained hereinbelow.

In fact, when negotiated curves the interior pair of driven wheels 5 covers a lesser distance on the ground than the centerline of the vehicle which we will take as a reference line. To cover a lesser distance, these interior wheels must rotate less than the rotation they will have when moving in the straight forward direction or in other words less than the rotation of two imaginary wheels placed on the centerline. On the other hand, the rotation of axle 3 and therefore the rotation of both driving wheels 1 is preset from the beginning and is always constant. But, due to the fact that there is a frictional engagement between driving wheels 1 and driven wheels 5, the driving wheels 1 corresponding to the interior driven wheels 5 will have the tendency to follow the reduced rotation of the interior driven wheels 5 and therefore will rotate less than their preset speed. This difference of the speed of rotation between the interior driving wheels 1 and the interior driven wheels will be absorbed by the resilient webs of the interior driving wheels 1 which will bend more than they would have bent when the vehicle moves in a straightt forward direction. Thus, curves will be negotiating smoothly and without any difficulties.

The resiliency of the material forming the webs is chosen in such a way as to provide a safe extra bending of the webs when negotiating curves.

Of course, when negotiating curves, the exterior pair of driven wheels 5 will cover, on the ground, a longer distance than the centerline, and by the same reasoning as above, it is apparent that the webs of the exterior driving wheel 1, will bend less, than their ordinary bending during the advance of the vehicle in straight forward direction.

In a further embodiment, where there are provided two pairs of driven wheels at each side of the vehicle, it will be necessary two live axles with two driving wheels fixed at the ends of each of them, but the same principle as above-explained will apply. With such double live axles 3 and four driving wheels 1, the power of the vehicle will be increased.

Another embodiment would be the possibility of applying the principle described in this application to all terrain vehicles which use for direction or steering the vehicle the principle of varying the speed of the wheels on one side in relation to the speed of the wheels on the other side. Then, the principle of one live axle would be retained, but the live axle would be split on the centerline of the vehicle, making each part independent and permitting independent control of the driven wheels on one side in relation to the other side.

I claim:

1. Differential type driving wheels system for driving self-propelled vehicles such as all terrain vehicles or the like, said differential system comprising:

a single power driven axle rotatably mounted on the body of the vehicle;

a driving wheel fixedly secured on each end of said axle, said axle extending between a pair of driven wheels disposed at each side of the vehicle with said driving wheels in frictional engagement therewith;

said driving wheels comprising radially projecting circumferentially bendable resilient webs, said webs having a predetermined substantial radial length and strength and being in constant frictional engagement with said driven wheels;

said frictional engagement providing the propelling force for the vehicle and independent bending of said webs permitting differential movement of the driven wheels when the vehicle is negotiating curves while still providing frictional drive thereto.

2. A system according to claim 1, wherein each of said driving wheels comprises:
   a metal sleeve;
   an annular resilient part rigidly secured around said sleeve;
   said bendable webs being fixedly secured around said annular resilient part and radially projecting therefrom.

3. A system according to claim 1, wherein each of said driving wheels comprises:
   a sleeve made of a resilient material,
   said bendable webs being fixedly secured around said resilient sleeve and radially projecting therefrom.

4. A system according to claim 3, wherein said resilient sleeve and said bendable webs form an integral part and are made of cast or molded solid polyurethane.

5. A system according to claim 2, wherein said annular resilient part secured around said metal sleeve, and said bendable webs are made of cast or molded solid polyurethane.

6. A system according to claim 2, wherein said annular resilient part secured around said metal sleeve, and said bendable webs are made of plastic.

7. A system according to claim 3, wherein said resilient sleeve and said bendable webs are made of plastic.

8. Differential type driving wheels system for driving self-propelled vehicles such as all terrain vehicles or the like, said differential system comprising:
   a single power driven axle rotatably mounted on the body of the vehicle;
   a driving wheel fixedly secured on each end of said axle, said axle extending between a pair of driven wheels disposed at each side of the vehicle with said driving wheels in frictional engagement therewith;
   said driving wheels comprising a metal sleeve and an annular resilient part rigidly secured around said sleeve, circumferentially bendable spring blades or webs being rigidly secured to said annular part and radially projecting therefrom, said blades having a predetermined length and strength and being in constant frictional engagement with said driven wheels,
   said frictional engagement providing the propelling force for the vehicle and independent bending of said spring blades permitting differential movement of the driven wheels when the vehicle is negotiating curves while still providing frictional drive thereto.

9. Differential type driving wheels system for driving self-propelled vehicles such as all terrain vehicles or the like wherein conventional differential means are eliminated, said system comprising:
   an axle actuated by a motor and rotatably secured to the body of the vehicle;
   driving wheels, each wheel being connected at one end of said axle and being mounted between a pair of said driven wheels disposed at each side of the vehicle,
   said driving wheels comprising a metal sleeve and bendable spring blades or webs, said blades radially projecting from said sleeve and being rigidly wedged around said sleeve by means of wedges which are pressed between two adjacent blades and are held in place by screws, said blades having a predetermined length and strength and being in permanent frictional engagement with said driven wheels,
   said frictional engagement providing the bending of said baldes in such a way as to provide the propelling of the vehicle and also the differential movement of the driven wheels when the vehicle is negotiating curves.

* * * * *

PO-1050
(5/69)

UNITED STATES PATENT OFFICE
CERTIFICATE OF CORRECTION

Patent No. 3,788,420                    Dated  January 29, 1974

Inventor(s)  JEAN PAUL LACROIX

It is certified that error appears in the above-identified patent and that said Letters Patent are hereby corrected as shown below:

IN THE SPECIFICATION:

Col. 4, line 5, "negotiated" should read
           --negotiating--

Col. 4, line 8, "negotiated" should read
           --negotiating--

Col. 4, line 29, "negotiating" should read
           --negotiated--

Signed and sealed this 2nd day of July 1974.

(SEAL)
Attest:

EDWARD M. FLETCHER,JR.          C.MARSHALL DANN
Attesting Officer               Commissioner of Patents